(12) United States Patent
Lee

(10) Patent No.: US 11,730,257 B2
(45) Date of Patent: Aug. 22, 2023

(54) FUSION INTERLOCKING BRISTLE STRIP AND METHOD OF MANUFACTURING THE SAME

(71) Applicant: Fook Yuen Lee, Senai (MY)

(72) Inventor: Fook Yuen Lee, Senai (MY)

(*) Notice: Subject to any disclaimer, the term of this patent is extended or adjusted under 35 U.S.C. 154(b) by 600 days.

(21) Appl. No.: 16/610,008

(22) PCT Filed: Mar. 20, 2018

(86) PCT No.: PCT/MY2018/000012
§ 371 (c)(1),
(2) Date: Oct. 31, 2019

(87) PCT Pub. No.: WO2018/182398
PCT Pub. Date: Oct. 4, 2018

(65) Prior Publication Data
US 2020/0060415 A1    Feb. 27, 2020

(30) Foreign Application Priority Data

Mar. 27, 2017   (MY) .......................... PI 2017000460
Oct. 17, 2017   (MY) .......................... PI 2017703930

(51) Int. Cl.
*B29C 65/08*   (2006.01)
*A46B 3/06*    (2006.01)
*A46D 3/04*    (2006.01)
*B29C 65/00*   (2006.01)
(Continued)

(52) U.S. Cl.
CPC ............... *A46B 3/06* (2013.01); *A46D 3/045* (2013.01); *B29C 65/08* (2013.01); *B29C 66/12441* (2013.01); *B29C 66/232* (2013.01); *B29C 66/729* (2013.01); *B29C 66/83221* (2013.01); *B29L 2031/42* (2013.01); *B29L 2031/7654* (2013.01)

(58) Field of Classification Search
CPC ......... B29L 2031/7654; B29L 2031/42; B29C 66/232; B29C 66/83221; B29C 66/729; B29C 66/12441; B29C 65/08; A46D 3/045; A46D 3/06
See application file for complete search history.

(56) References Cited

U.S. PATENT DOCUMENTS

| 2004/0076790 A1* | 4/2004 | Wylie ................... B29C 66/729 |
| | | 156/173 |
| 2004/0117934 A1* | 6/2004 | Pfenniger .......... A46B 15/0032 |
| | | 15/167.1 |

(Continued)

FOREIGN PATENT DOCUMENTS

| JP | 2004109216 A | * | 4/2004 |
| JP | 2011130895 A | * | 7/2011 |

(Continued)

OTHER PUBLICATIONS

Machine translation of JP-2011130895-A (Year: 2011).*
Machine Translation of JP-2004109216-A (Year: 2004).*

*Primary Examiner* — Daniel McNally
(74) *Attorney, Agent, or Firm* — Maschoff Brennan

(57) ABSTRACT

The present invention relates to a brush with fusion interlocking bristle strip and a method of manufacturing the same. The brush includes carrier strips and knotted bristle strips bonded together by ultrasonic welding and interlocking.

5 Claims, 17 Drawing Sheets

(51) Int. Cl.
    *B29L 31/42*     (2006.01)
    *B29L 31/00*     (2006.01)

(56) References Cited

U.S. PATENT DOCUMENTS

2012/0023692 A1* 2/2012 Boucherie .............. A46B 3/06
    15/207.2
2014/0079908 A1* 3/2014 Kato .................. B29C 66/7212
    428/140

FOREIGN PATENT DOCUMENTS

| | | |
|---|---|---|
| JP | 2011130895 A | 7/2011 |
| WO | 2015147631 A1 | 10/2015 |

* cited by examiner

100

500

FUSION INTERLOCKING BRISTLE STRIP AND METHOD OF MANUFACTURING THE SAME

FIELD OF INVENTION

The present invention relates to a brush with fusion interlocking bristle strip and a method of manufacturing the same.

BACKGROUND OF THE INVENTION

Brush strips are widely used in cleaning equipment such as vacuum cleaners. Vacuum cleaners have brush strips which aid in the removal of dirt, debris, lint, etc. from a surface.

The bonding methods employed to connect the bristles to the polymer strip is essential in producing sturdy brushes.

There are three state of the art technologies for bonding bristles to carrier strips. These are (1) sewing the bristle strips to the carrier, (2) overmoulding the bristles to the carrier strip, (3) fusion using heat or ultrasonic welding to melt the bristles to the carrier strips.

One prior art technology has brush strips sewn to the base for bonding bristles to carrier. Sewing brush strips is a slow and inefficient manufacturing process because the stitches needs to be formed individually. In addition, the seam may come apart once the thread frays causing the bristles to drop off from the brush. Finally, the needle penetrating through the carrier strip could damage the carbon fibre filament causing it to break off.

Another prior art employs overmoulding for bonding. This manufacturing process has multiple problems. Overmoulded carrier strips could have flashes (excess material attached due to the leakage between the two surfaces of the mold), warpage due to post-moulding shrinkage and poor adhesion due to material contamination. In addition, the overmoulding of knitted strips process requires high accuracy to prevent dimensions being out of specification. The carrier strips could also have defects related to burned edges, sticking and short shots. The numerous issues arising from overmoulding tends to diminish the quality of the brushes.

In yet another prior art technology, fusion techniques are employed to bond the brush strip. In one embodiment, a brush manufacturing method involves melting the monofilament together with the carrier strips at the base and the sides. There is intermingling of the monofilament material and the base material. The bonding reduces the mechanical strength of the monofilament because it is melted at the proximal end. The tensile strength is reduced because of damage to the chain structure of the molecules. This method cannot be applied to materials with very high melting points such as stainless steel, carbon fibre or natural fibre.

Another fusion based brush making technology utilises the ultrasonic process to bond the bristles to a base or carrier. Once again, this approach requires the bristles to be melted to form a bond with the carrier material. The bond strength is weakened because the mechanical structure of the bristles is damaged to form the bond. The bristles would drop off if the bonding point were to break off. The bristle of the prior art brushes pull-out easily due to weak bonding.

In demanding applications such as vacuum cleaners, the brushes are subject to high centrifugal forces (thousands of rpm) and utilised in rough and hard surfaces. For the brush to have high durability, the bonding strength is critical to prevent bristle drop-off.

In other applications where brush strips are used in printers to dissipate static charges built on the papers to prevent paper jams and produce printouts without smear, an improved brush is required.

There is a continuing need for improved brush strips to overcome the strength and performance problems associated with the existing technologies.

SUMMARY OF THE INVENTION

Accordingly, the present invention provides a brush and a method of manufacturing the same. The invention uses the ultrasonic fusion process to create an interlocking feature.

In an embodiment, of the present invention, the ultrasonic process is utilised to form a bond between the carrier strips. The bond firmly holds the bristle strips in an interlocking feature.

In an embodiment, the present invention provides a brush with interlocking ultrasonic fusion bonding. The brush includes a knitted strip having a plurality of bristles arranged in parallel with two looped ends to form a body portion to assemble with multiple profiles, and having at least one row of stitching across the body portion towards one end; and a carrier strip configured to accommodate the knitted strip of fibers wherein the strip includes a slot for accommodating the knitted strip; wherein the stitching of the knitted strip is interlocked to the carrier strip by fusion bonding including ultrasonic welding.

In an advantageous aspect the technology is especially suitable for non-heat-fusible bristle materials such as carbon fibre, since the filament or yarn is not an active component to the bonding process. The invention extends the range of potential materials that can be used to make the brush strips.

In an embodiment, the bristle strip is in between two walls of the carrier strips, held together with the interlocking feature. In combination with the other design features, this embodiment creates a bristle strip with higher strength, superior quality and reliability attributes.

In another advantageous aspect, the fusion interlocked bristle strip has less bristle drop-off/zig-zag after being tested in user simulation conditions. In addition, it has higher pull force and peel force.

In an embodiment, the brush includes a knitted strip of fibres arranged in a configuration to assemble with multiple profiles, and a carrier strip configured to accommodate the knitted strip of fibres wherein the carrier strip includes a slot accommodating the knitted strip, wherein the knitted strip is bonded/interlocked with the plastic strip by fusion bonding using ultrasonic welding.

In an embodiment, the present invention provides a method of manufacturing bristle strips with the interlocking feature. The method includes the steps of arranging a plurality of bristles to form a knitted strip configured to be assembled with multiple profiles, produced by injection, compression or extrusion moulding. The brush includes interlocking to bond the knitted strip with the at least one carrier strip by fusion bonding including ultrasonic welding.

The brush includes at least one carrier strip and bond the knitted strip with a fusion bonding process using ultrasonic welding and/or heat stamping.

DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it shall be understood that it is not intended to limit the scope of the invention to these embodiments.

DETAILED DESCRIPTION OF THE EMBODIMENTS

Various embodiments of the present invention provide a fusion interlocking strip brush and a method of manufacturing the same. It shall be apparent to a person skilled in the art that terms such as knitted strip, carrier strip and bristle strip are used interchangeably in the present disclosure but mean the brush elements as well known in the art.

Figure 1:
FIG. 1 shows a brush strip before the user simulation test in accordance with an embodiment of the invention.

Referring to FIG. 1 a brush (100) is shown before the user simulation test.

Figure 2:
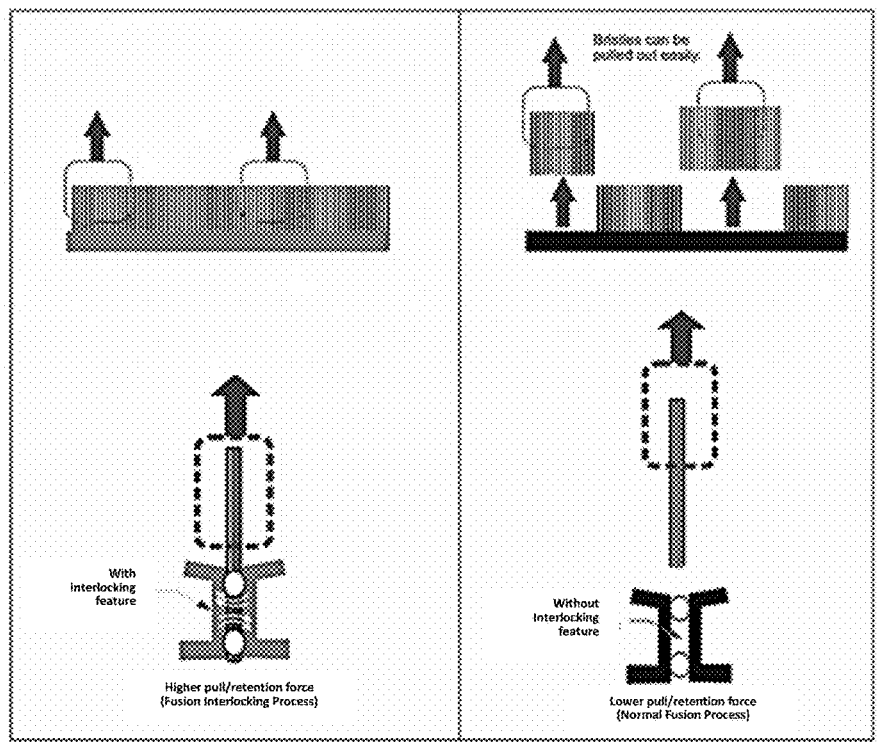
FIG. 2 shows pull force test comparison for brush with prior art in accordance with an embodiment of the present invention.
Figure 2:
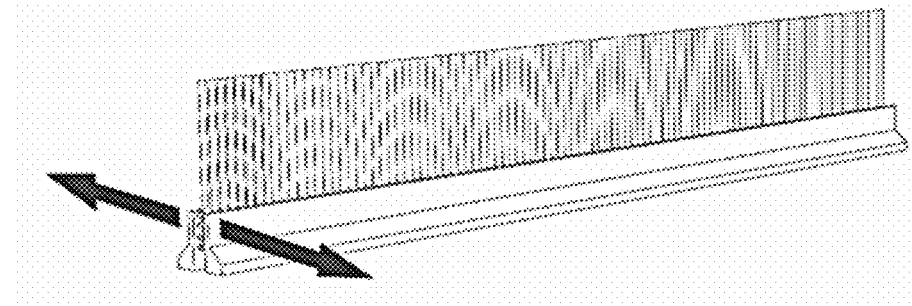
Figure 2:
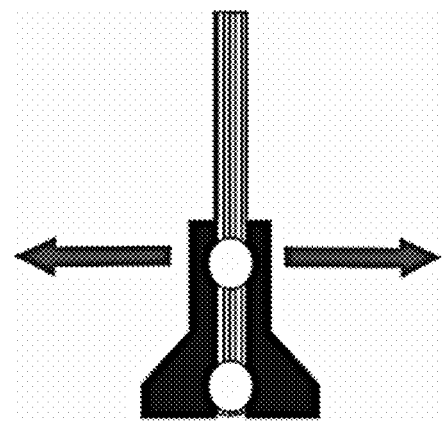

In FIG. 2, a pull force test comparison (200) for brush of the present invention with one of the prior arts in accordance with an embodiment of the present invention. The brush of the present invention has higher strength.

Figure 3:
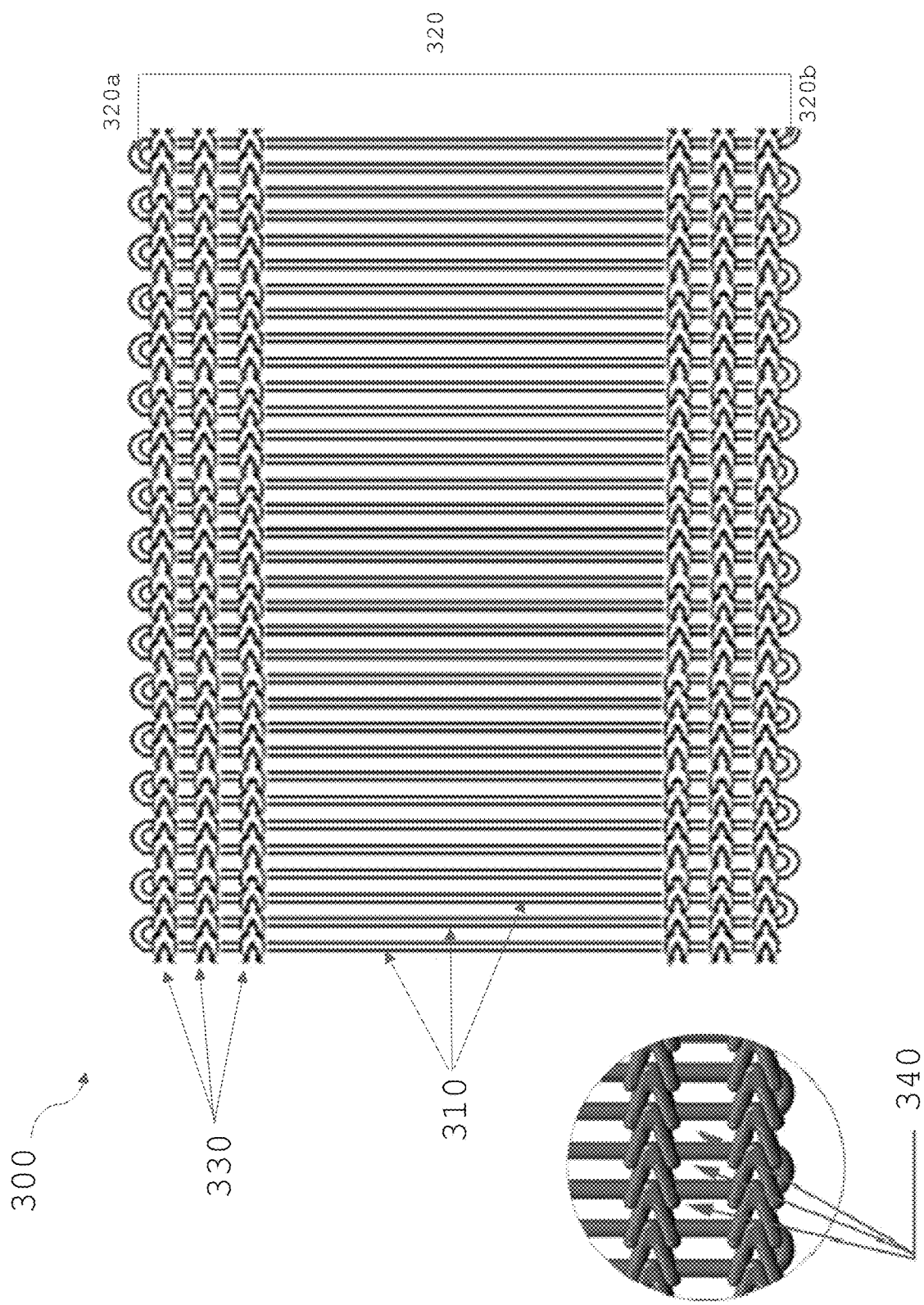
FIGS. 3, 3a and 3b shows the knitted strip in accordance with an embodiment of the present invention.
Figure 3A:
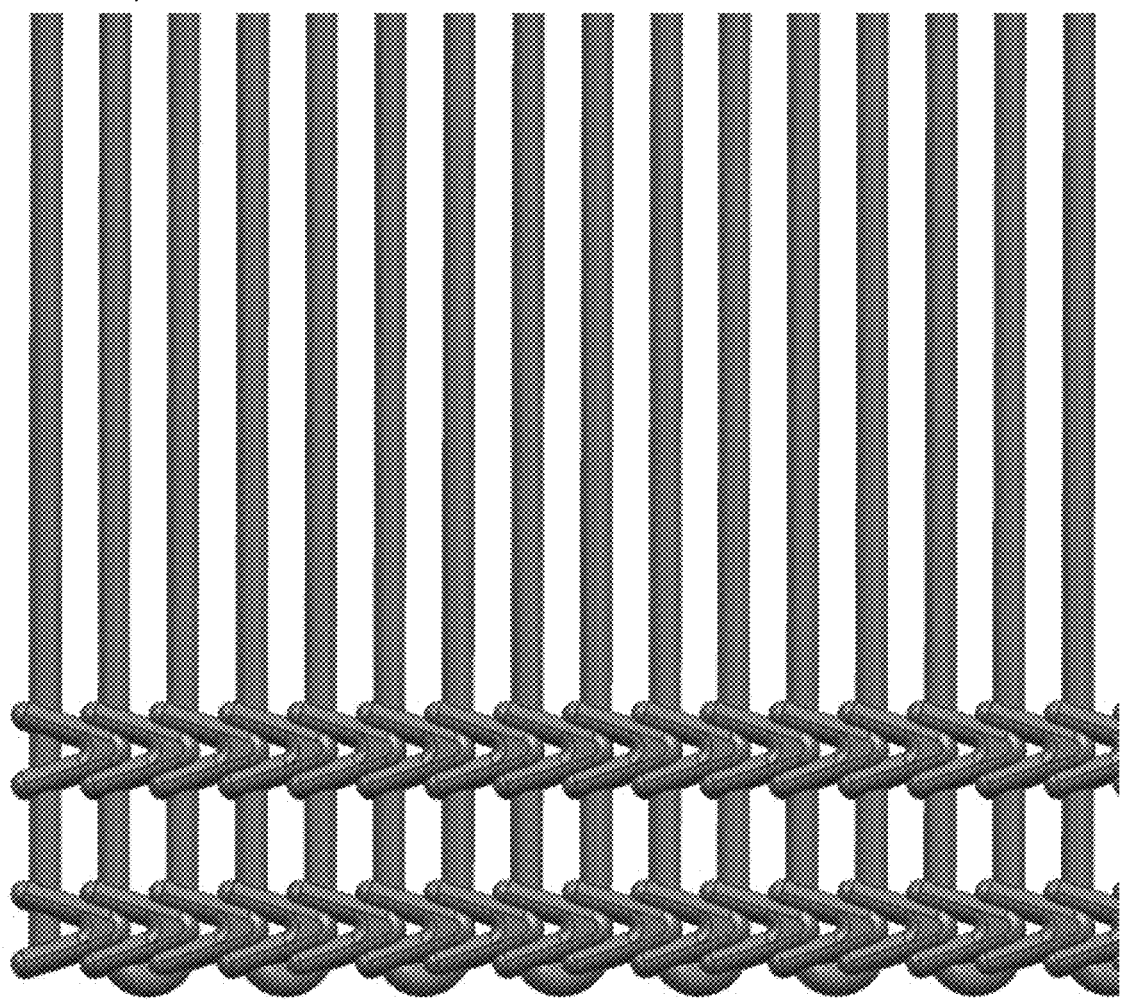
Figure 3B:
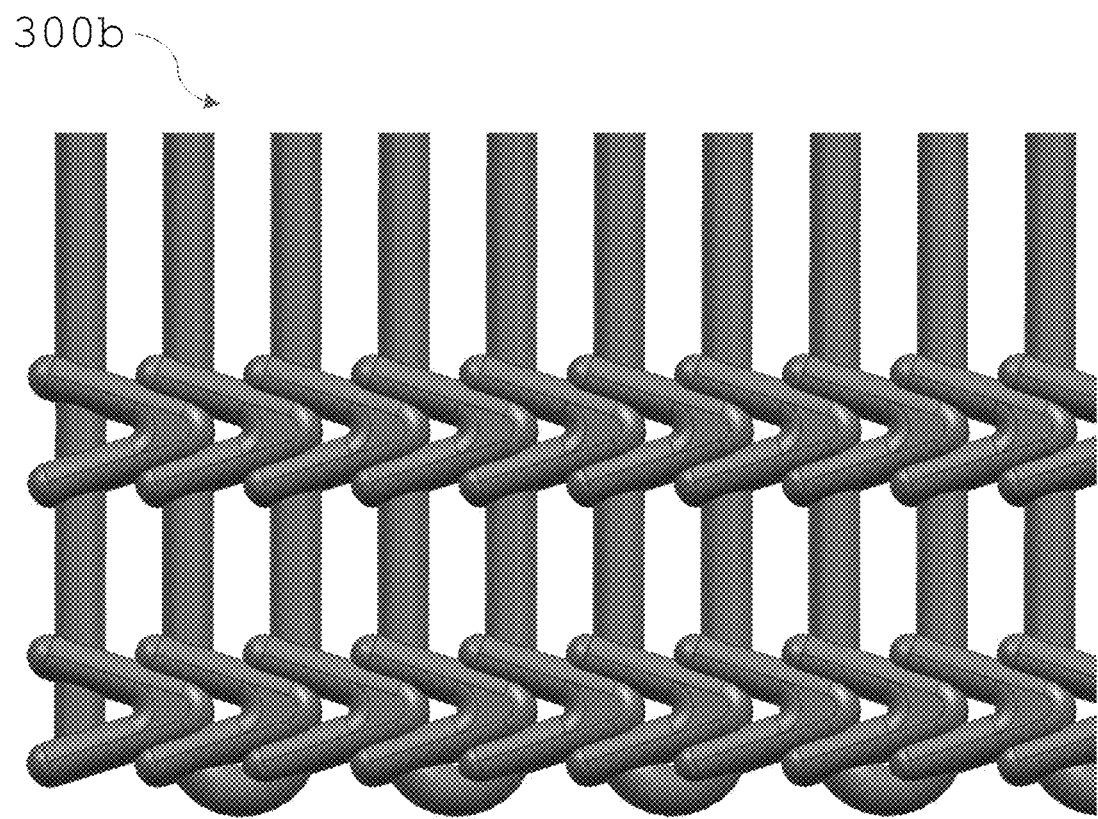

Referring to FIGS. 3, 3a, 3b, a knitted strip (300) is provided in accordance with an embodiment of the present invention. The knitted strip (300) includes a plurality of bristle fibres (310) arranged in parallel with two looped ends (320a, 320b) to form a body portion.

In an embodiment, the loops (330) enables creation of interstices. The carrier strips are melted by the fusion process where, the molten carrier material flows through the interstices (340) of the knitted loops. Once cooled, the hardened material forms an interlocking feature bonding the carrier strips and cementing the bristles in a strong grip.

In an embodiment, the knitted strip (300) includes at least one row of stitching (330) across the body portion towards one end.

In an embodiment, the stitching (330) comprises knitted loops or a loop chain or locked stitches (300a, 300b).

Figure 4:
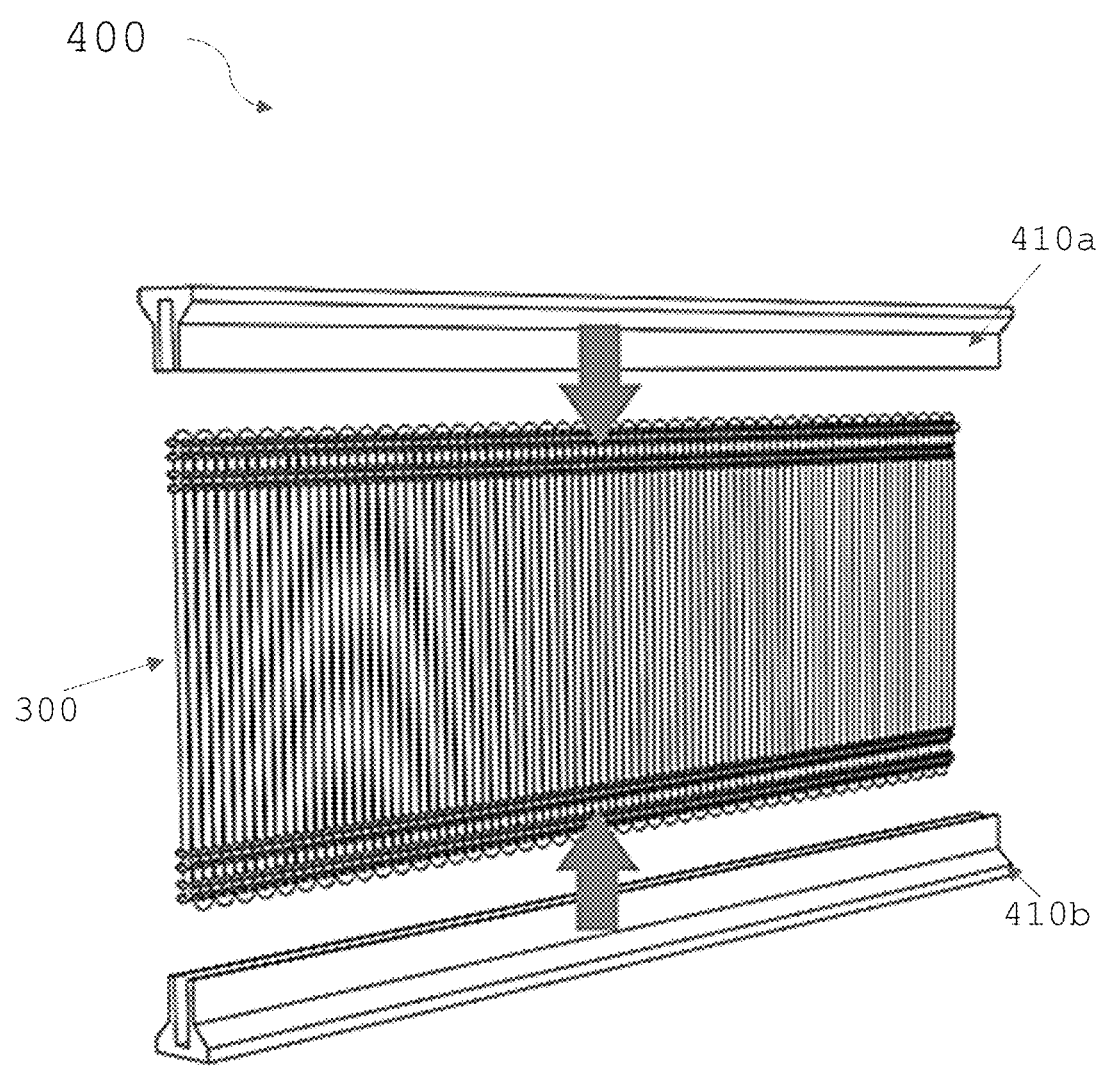
FIG. 4 shows a knitted bristle strip and carrier strips being combined in accordance with an embodiment of the invention.

Referring to FIG. 4, the knitted strip (300) and two carrier strips (410a, 410b) are shown to be combined as (400) in accordance with an embodiment of the invention.

Figure 5:
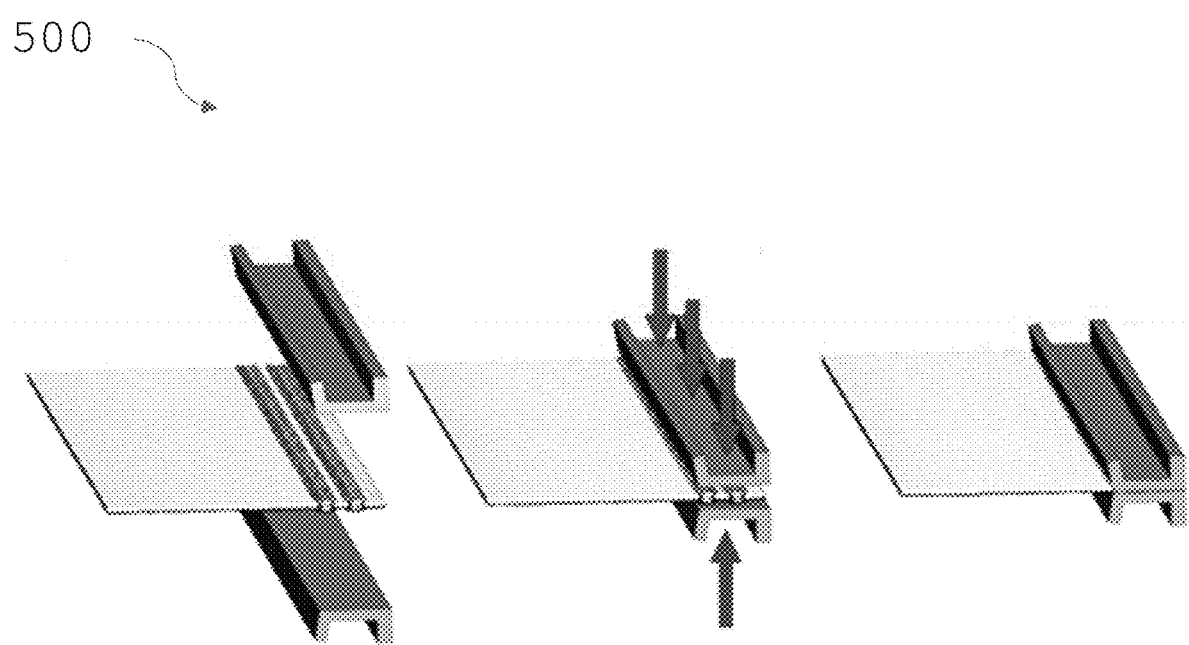
FIG. 5 shows an ultrasonic bonding of a knitted strip and two carrier strips in accordance with an embodiment of the present invention.
Figure 5A:
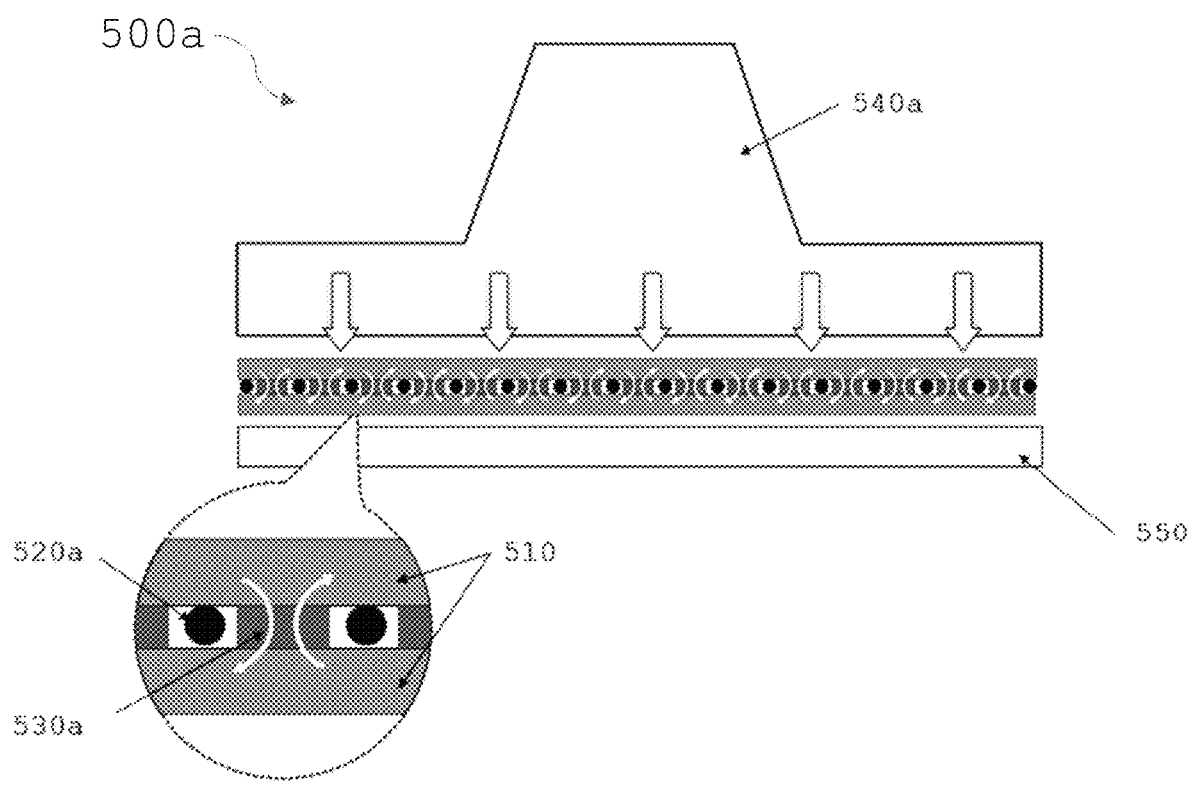
FIG. 5a shows a side view of the ultrasonic fusion process in accordance with an embodiment of the present invention.

Referring to FIG. 5-5a, the ultrasonic bonding of the knitted strip and two carrier strips are shown as (500, 500a) in accordance with an embodiment of the present invention.

In a preferred embodiment, as shown in FIG. 5a, the polymer carrier strip (510a) of the brush are two pieces configured to sandwich the bristles. The two-piece/wall carrier strip (510a) is held by a metal support base (550a) and pressed using an ultrasonic horn (540a).

The carrier strips are melted by the fusion process. The molten carrier material flows through the interstices (520a) of the knitted loops. Once cooled, the hardened material forms an interlocking feature bonding (530a) the carrier strips and cementing the bristles in a strong grip.

In an embodiment, longer ultrasonic vibration times will generate a higher temperature. The time duration of the vibration would depend on the brush profiles. In an advantageous aspect, the brush strip is assembled in multiple profiles requiring different ultrasonic durations of vibration.

In an embodiment, as shown in FIG. 5-5a, the ultrasonic welding (500, 500a) process consists of holding one side of the carrier strip (510a) with a metal support base (550); sandwiching the knitted strip in between the carrier strips (510a); pressing the carrier strips from any side with an ultrasonic horn (540a); the bristles and carrier are clamped tightly with uniform pressure applied along the whole strip. The setup enables the brush strip to be welded in one cycle, ensuring even bonding across the strip.

Figure 6:
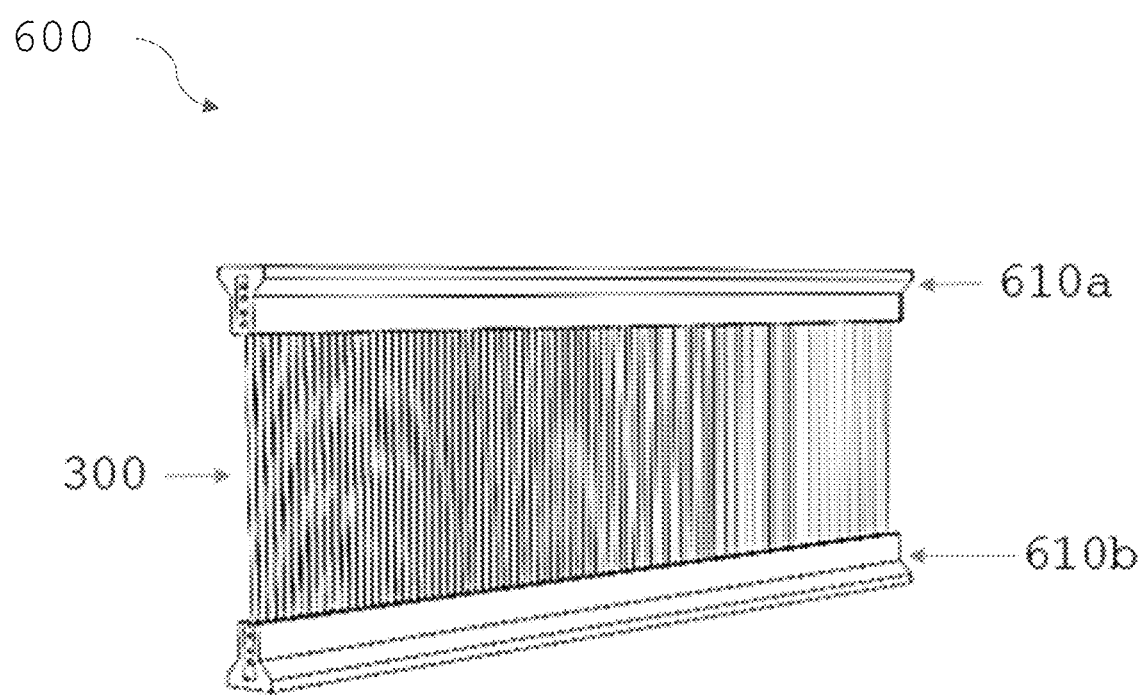
FIG. 6 shows brush strip after ultrasonic welding in accordance with an embodiment of the present invention.
Figure 6A:
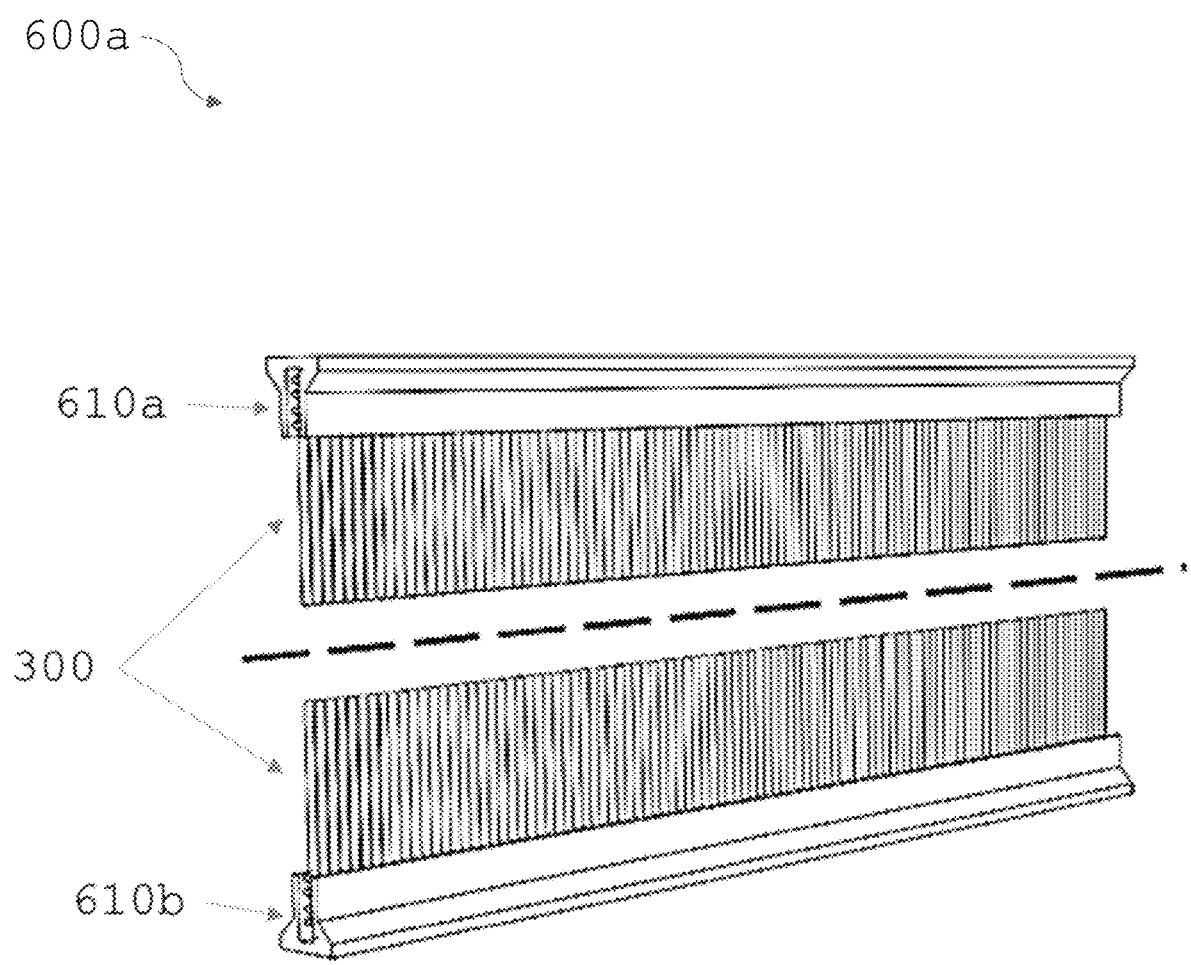
FIG. 6a shows brush strip after being cut at the middle in accordance with an embodiment of the present invention.

FIGS. 6 and 6a show views of the knitted strip (300) cut in the middle of the fibre to obtain a brush (600). When the knitted strip is cut in the middle, two pieces of brush are obtained in accordance with an embodiment of the present invention. The two brush includes two carrier strips (610a, 610b).

Figure 7:
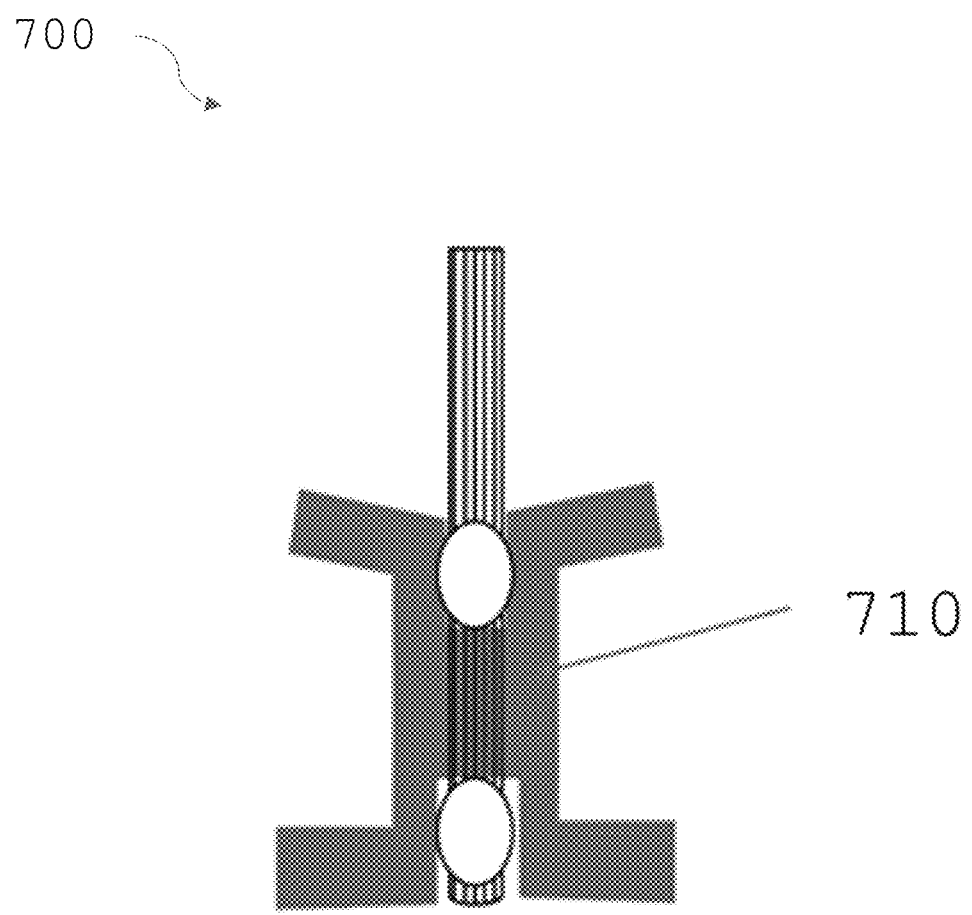
FIG. 7 shows the interlocking feature created by the fusion process in accordance with an embodiment of the invention.
Figure 7A:
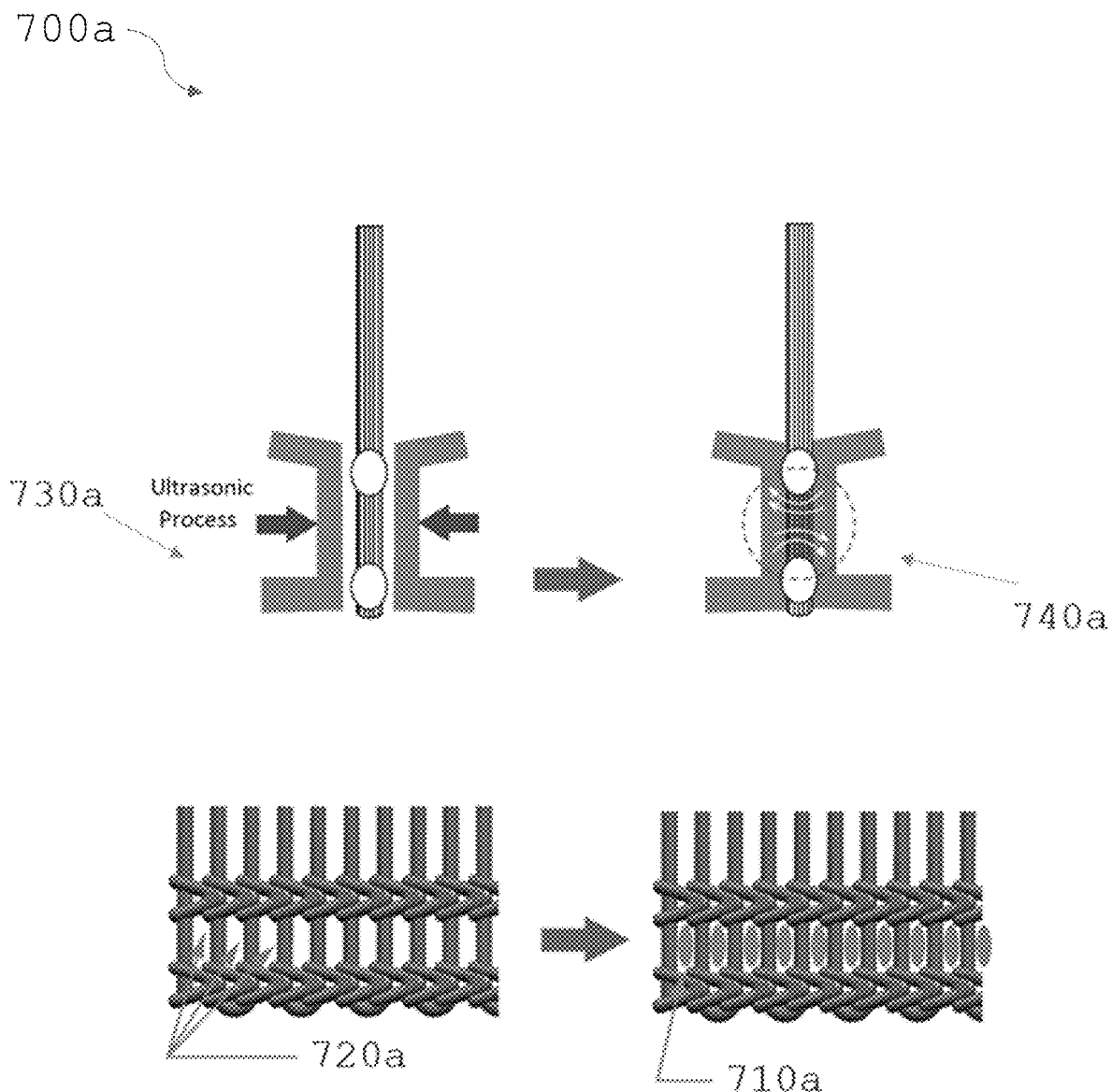
FIG. 7a shows the formation or the interlocking bond during the ultrasonic fusion process where the molten from the polymer carrier strip flows through the interstices in accordance with an embodiment of the invention.

FIGS. 7 and 7a shows bonded strip (700, 700a) with the interlocking feature (710, 710a) created by the fusion process. The carrier strip is bonded by interlocking with ultrasonic fusion (730a). The carrier strip is clamped from opposite sides. The molten carrier strip material flows through the interstices of the knitted loops (720b) to form an interlock (740a). The interlocking feature (710, 710a) exhibits a stronger holding force over the bristles. Once cooled, the hardened material forms an interlocking feature bonding (710a) the carrier strips and cementing the bristles in a strong grip. The knitted strip interstices form critical pathways allowing a molten carrier strip to flow through and form interlock bonds.

In an embodiment, the ultrasonic machine generates a high frequency vibration of 15 kHz-30 kHz and transfers the energy produced from the vibration to the horn and the polymer carrier, bonding the polymer carriers together by melting the polymer carrier material from the generation of high heat. The process is optimized to minimize melting or structural damage to the bristles and/or holding yarn.

It will be understood to a person skilled in the art that one or more polymer carrier strips may be placed with the bristles in different arrangements.

Figure 8:
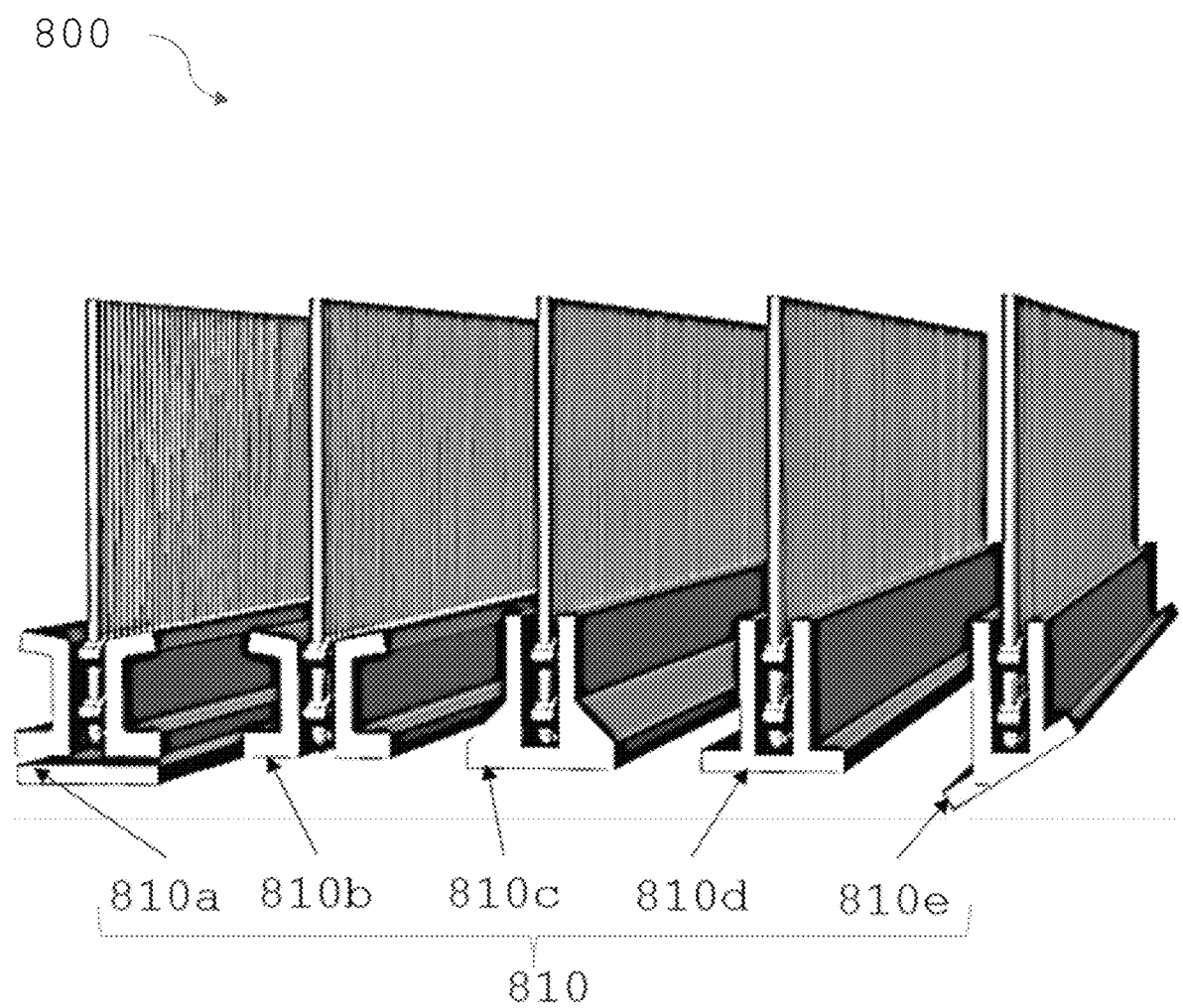
FIG. 8, 8a-b show multiple configurations of the carrier strips in accordance with an embodiment of the invention.

Referring to FIG. 8, a side view of the carrier in multiple configurations in accordance with an embodiment of the invention.

Figure 8A:
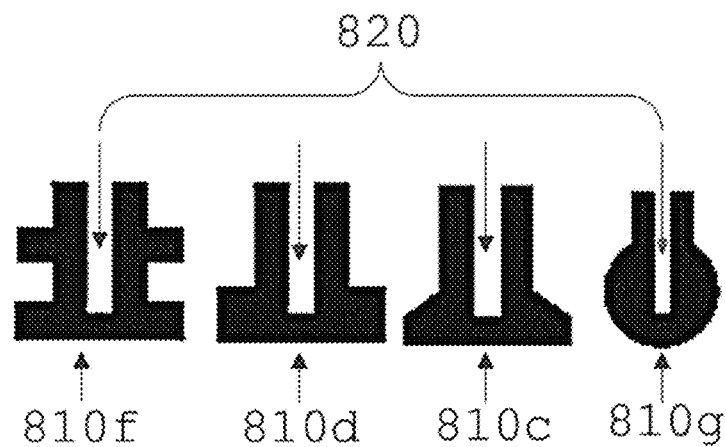
Figure 8B:
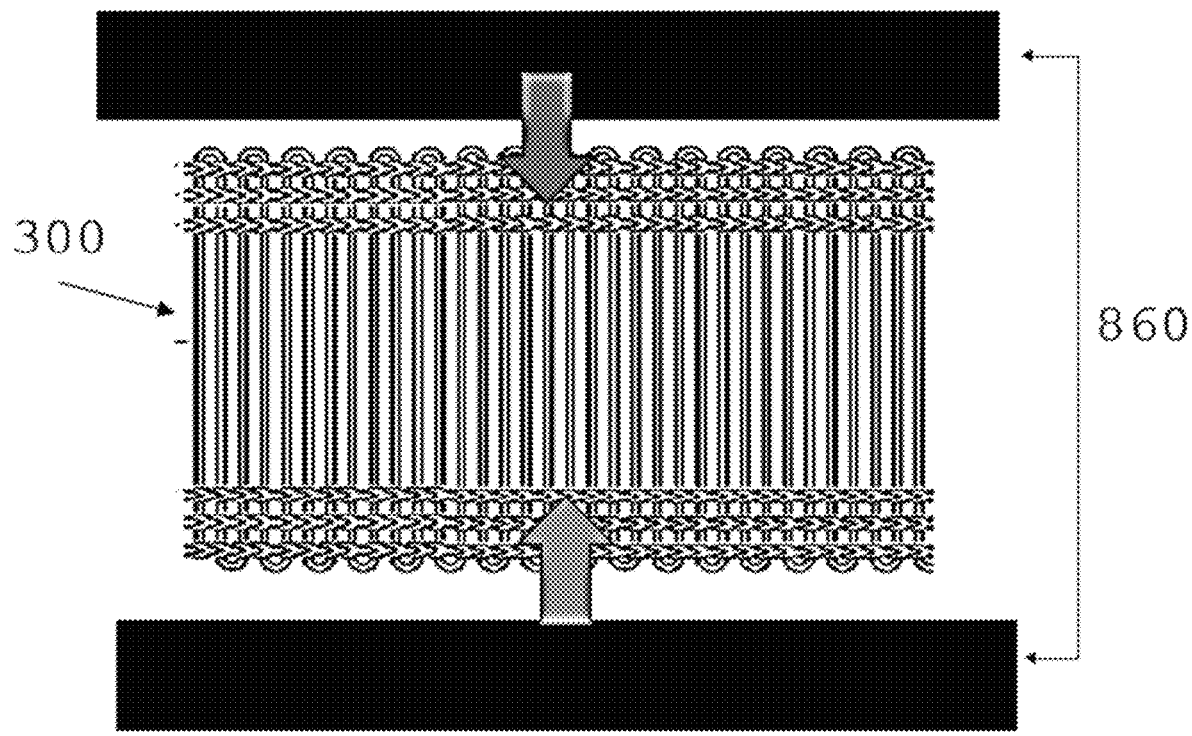

Referring to FIG. 8, 8*a-b*, a carrier strip (810) is provided in multiple configurations (810*a*, 810*b*, 810*c*, 810*d*, 810*e*, 810*f*, 810*g*) with a slot (820) shown in FIG. 8*a* in accordance with an embodiment of the invention. The multiple profiles include an angled strip (810*e*), three separate carrier strips, etc. The brush with carrier strips (810) configured with different profiles.

The brush consists of the knitted strip in the middle of two polymer carrier strips in a sandwich configuration.

In an embodiment, the carrier strip is formed by injection moulding, compression moulding or extrusion moulding.

In an embodiment, the plurality of fibres is arranged in parallel with two looped ends to form a body portion.

In an embodiment, the fibres includes a combination of electrically conductive and electrically non-conductive fibres.

In an embodiment, the fibres are conductive fibre and are silver, copper, brass, phosphor bronze, stainless steel, or carbon fibres.

In an embodiment, the fibres are non-conductive fibres and are cotton, flax, hemp, wool, silk, fur, glass, mineral, cellulose, viscose, acetate, polyamide, polyester, phenol formaldehyde, polyvinyl chloride, acrylic, polyethylene, polypropylene, polyurethane, or elastomeric fibres.

In an embodiment, the stitching is performed using thread made of polymer, non-polymer or natural fibres to form a holding yarn. The main functionality of the yarn is to hold the bundle of bristles together. The yarn creates interstices for the interlocking feature.

In an embodiment, the thermoplastic polymer material is polyamide, thermoplastic polyurethane, ethylene-vinyl acetate, polyethylene, polypropylene, thermoplastic elastomer or any thermoplastic vulcanizate.

In an embodiment, the invention enables the utilization of non-polymer bristle material including natural fibres, carbon fibres, stainless steel etc with higher melting points.

In an embodiment, the bristle material includes polymer fibres, carbon fibres, non-polymer fibres, stainless steel and natural fibres.

In an embodiment, the present invention provides application of uniform pressure across the strip. The whole strip is welded simultaneously to create uniform interlocking bonds along the strip.

Figure 9:
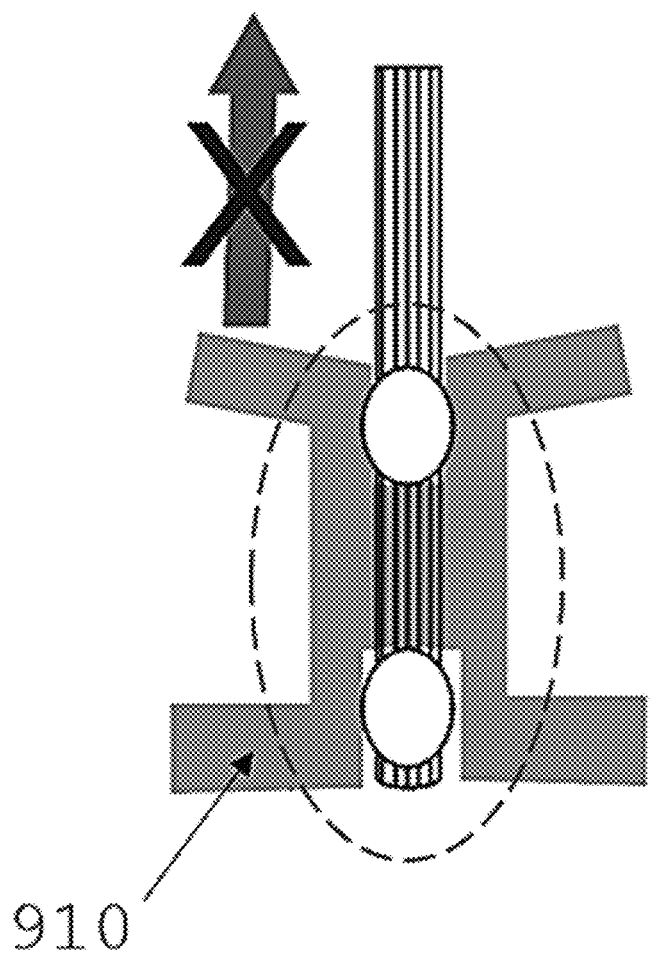
FIG. 9 shows a bulbous configuration as an undercut feature to improve the bristle strip strength and that acts as a stopper in accordance with an embodiment of the invention.
Figure 10:
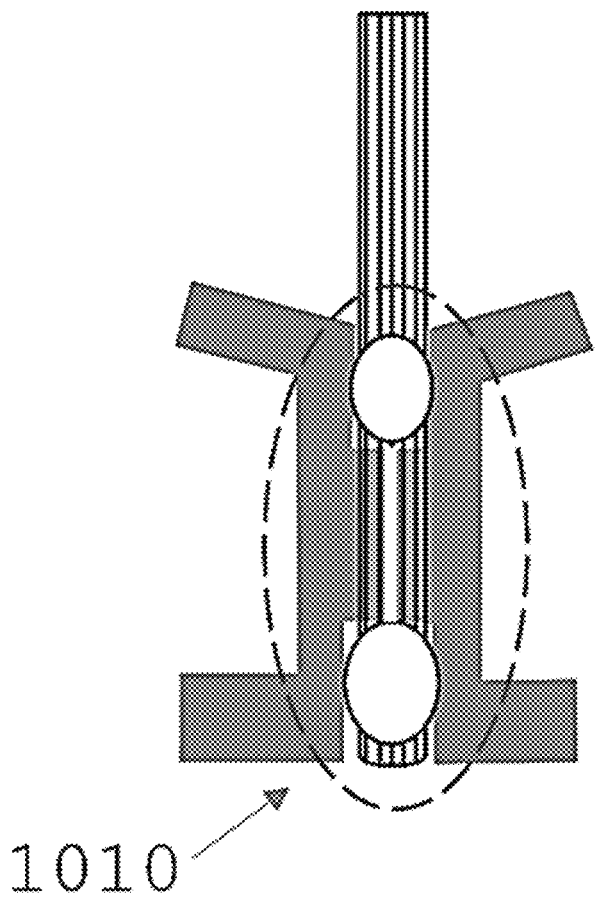
FIG. 10 shows the bulbous configuration as the undercut feature enables the two carrier strips to be pulled closer, creating stronger bonds in accordance with an embodiment of the invention.

In an embodiment, the carrier strip (900) includes a bulbous configuration as an undercut feature (910) as shown in FIG. 9. The bulbous configuration is at the base to strengthen the holding of the bristles (310) wherein the bulbous configuration creates a shorter distance between the carrier strips, creating a stronger bonding point during the ultrasonic process.

In an embodiment, the bulbous configuration as the undercut feature (1010) acts as a catch or stopper to prevent the knitted strip (300) from sliding out wherein a larger diameter warp yarn prevents the bristles (310) from sliding out from the carrier strips (1000).

In an embodiment, the ultrasonic fusion process creates a molten interface on the carrier strip (810) surface wherein a clamping force is applied to press the carrier strip and the molten material flows through the interstices of the knitted loops and around the knitted strip yarn to form the interlocking bond.

Figure 11:
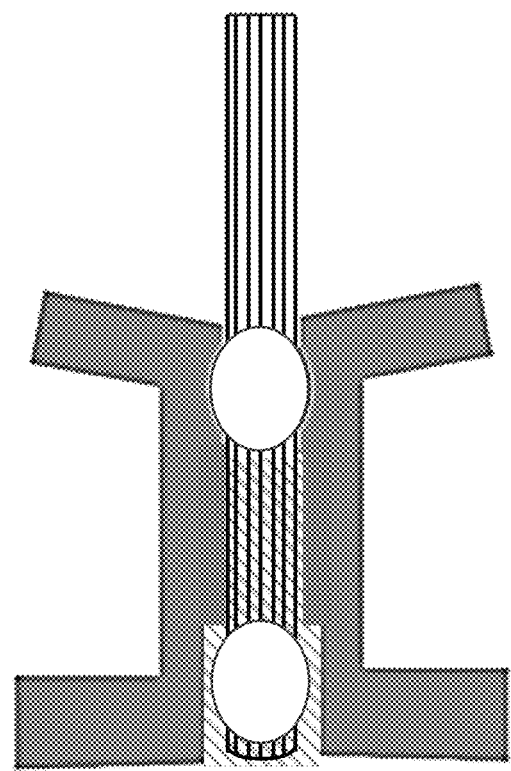
FIG. 11 shows the application of an adhesive at the bottom to improve the bristle strength in accordance with an embodiment of the invention.

In an embodiment as shown in FIG. 11, an adhesive is applied to carrier strip 1100 to strengthen the adhesion of the bristles to the carrier. The adhesive fills the gaps in between the bristles and the carrier strip to create additional attachments between the bristles and the carrier.

In an embodiment, the brush achieves a high retention force that prevents the bristles from dropping off when attached to a roller with high spin forces or upon contact with rough surfaces.

The invention maintains the mechanical integrity of the bristle. The present invention bonds the carrier material at the interstices created by the knitting loops. The bristles retain a high tensile strength because there is no damage to the chain structure of the molecules.

In an embodiment, the retention force of the knitted bristles is produced by the interlocking feature which is created by molten flow through the knitted loops/interstices. It forms a strong bond between the two sides of the carrier strips.

In an advantageous aspect, the bristles retain a high tensile strength because there is no damage to the chain structure of the molecules.

While the present invention has been described with reference to one or more exemplary embodiments, it will be understood by those skilled in the art that various changes can be made in respect of the configuration of components, without departing from the scope of the present invention. In addition, many modifications can be made to adapt a particular geometry or dimension to the teachings of the disclosure without departing from the scope thereof. Therefore, it is intended that the present invention not be limited to the particular embodiment(s) disclosed as the best mode contemplated, but that the invention will include all embodiments falling within the scope of the appended claims.

The invention claimed is:

1. A method of manufacturing a brush with fusion interlocking bristle strip, the method comprising:
    arranging a plurality of bristle fibers (310) to form a knitted strip (300) configured to be assembled with multiple profiles;
    producing by injection molding, at least one carrier strip (810) having a slot (820) to accommodate the knitted strip (300);
    interlocking to bond the knitted strip (300) with at least one carrier strip (810) by fusion bonding using ultrasonic welding; and
    applying an adhesive to a bottom of the at least one carrier strip to strengthen adhesion of the bristles (310) to the at least one carrier strip (810) as the adhesive fills in gaps between the bristles (310) and the at least one carrier strip (810);
    wherein the at least one carrier strip (810) includes a bulbous configuration as an undercut feature (1010) configured to create a shorter distance between walls of the at least one carrier strip (810) thereby creating a stronger bonding point, and wherein each of the at least one carrier strip is a multi-piece polymer strip, wherein the bulbous configuration acts as a catch or stopper to prevent the knitted strip (300) from sliding out wherein a warp yarn prevents the bristles (310) from sliding out from the at least one carrier strip (810);
    wherein the ultrasonic welding further comprises the steps of:
        holding one side of the at least one carrier strip (810) with a metal support base (860);
        sandwiching the bristles (310) inside the slot (820) of the at least one carrier strip (810);
        pressing the at least one carrier strip (810) from opposite sides with an ultrasonic horn;

generating a high frequency vibration by an ultrasonic machine and transferring the energy produced from the vibration through the horn into the at least one carrier strip (810); and melting a wall of the carrier strip in contact with the bristles for flowing a molten fluid through an interstice to form an interlocking bond;

bonding the at least one carrier strip due to generation of high heat;

wherein the plurality of bristle fibers (310) of the knitted strip (300) is arranged in parallel with two looped ends to form a body portion;

wherein the fibers include a combination of electrically conductive and electrically non-conductive fibers;

wherein the ultrasonic welding creates a molten interface on the at least one carrier strip (810) surface.

2. The method as claimed in claim 1 wherein the knitted strip (300) includes interstices (720a) that form critical pathways allowing a molten carrier strip to flow through and form interlock bonds.

3. The method as claimed in 2 wherein the carrier strip (810) is bonded by the ultrasonic welding at the interstices created by the knitted strip (300) wherein an interlock feature (710a) is created as a primary mechanism for locking the bristle fibers in place.

4. The method as claimed in 3 wherein the ultrasonic welding preserves strength of the bristles (310) by maintaining its structure wherein the molten carrier encloses the bristles.

5. The method according to claim 1, wherein said ultrasonic operating frequency for manufacturing the brush is 15 kHz-30 KHz.

* * * * *